May 1, 1951 F. J. ROSS 2,551,294
TELESCOPING TUBE CONSTRUCTION
Filed Aug. 23, 1946
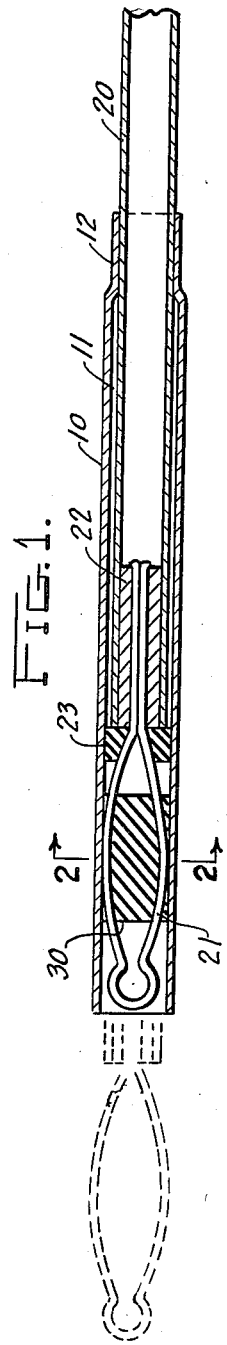
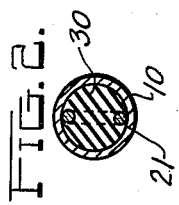
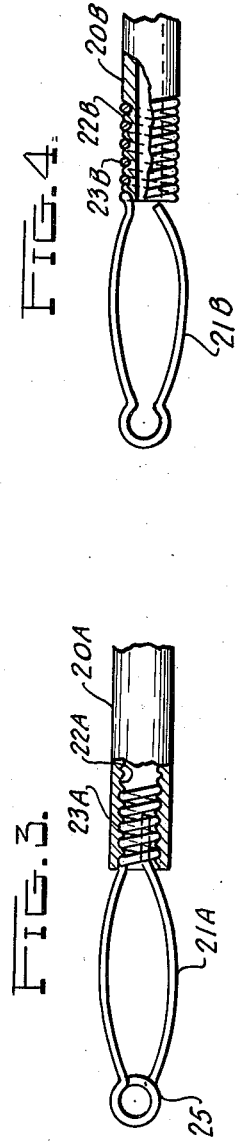
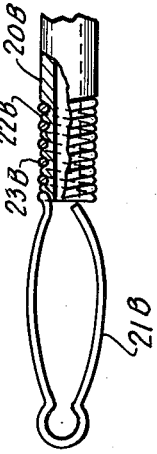
INVENTOR.
Frank J. Ross
BY
*Hawke & Hardisty*
ATTORNEYS Patented May 1, 1951

2,551,294

UNITED STATES PATENT OFFICE 2,551,294

TELESCOPING TUBE CONSTRUCTION

Frank J. Ross, Detroit, Mich.

Application August 23, 1946, Serial No. 692,447

2 Claims. (Cl. 287—58)

The present invention relates to telescoping tube construction and specifically to such construction as applied to extensible antenna for radio apparatus, though applicable in other telescoping tube uses.

Among the objects of the invention is to provide telescoping tube construction which, although the sections are freely movable when desired, will remain in adjusted position.

Another object is to provide telescoping tubes which will conduct electric current from one section to the next with a minimum of resistance and in which the contacting conducting surfaces are self cleaning.

Other objects and advantages will be apparent to those skilled in the art upon reference to the following description and the accompanying drawings in which Figure 1 is a longitudinal central sectional view of the telescoped ends of two tubes.

Figure 2 is a section on line 2—2 of Figure 1.

Figures 3 and 4 show in part section views of modified structures.

In the drawings, two telescoping tubes are shown at 10 and 20, the outer one 10 being sufficiently larger than the inner one 20 to provide a thin space 11 surrounding the inner tube and being constricted for a short distance at its end as indicated at 12. This constricted portion 12 should provide a snug sliding fit for the inner tube 20.

The tube 20, at the end enclosed in tube 10, is provided with friction means acting on tube 10 and serving to retain the adjusted relative position of the tubes. This friction means may consist of a loop 21 of spring wire, the free ends of which are passed longitudinally through a plug 22 fitted into the end of tube 20. The loop 21, plug 22 and tube end are preferably brazed or soldered together. Around the loop 21, at the plug end, is placed a thick washer or plug 23 of fibre or other, preferably non-metallic, more or less resilient material, adapted to slidably fit the inside of tube 10 and prevent lateral movement of the tube end.

The loop 21 should be relatively long so as to present as much contact as possible with the inside wall of tube 10 and should, in its relaxed condition, be sufficiently wide so that, when in tube 10, it will exert considerable pressure against the wall thereof.

For use in an antenna, the pressure of the loop will usually be sufficient to maintain the tubes in adjusted relation. However, for certain other uses for which the structure is adapted, it may be necessary or desirable to have more pressure than is conveniently obtainable, using the wire alone. In such cases, the pressure of the wire against tube 10 may be reinforced by inserting in the loop 21 a plug 30 of rubber or its equivalent.

In Figures 3 and 4 are shown modified forms of attachment of the loop to the inner tube.

In Figure 3, the end of tube 20A is shown as provided with suitable inside threads 22A and the loop 21A as having one of its ends coiled as at 23A and cooperating with such threads, being soldered or brazed in position.

In Figure 4, the tube 20B is provided with threads 22B on the outer surface with the coiled end 23B of loop 21B cooperating therewith and brazed or soldered.

Further, as indicated in Figure 3, the free end of the loop may consist of a complete turn 25 of the wire instead of a portion of a turn as in the other figures.

I claim:

1. In electric current conducting telescoping tube construction, an inner and an outer tube, said outer tube being of sufficiently large diameter to provide a thin space between it and the inner tube and having its end portion constricted to slidably fit the inner tube, friction means to maintain the relative longitudinal position of said tubes, said friction means consisting of an elongated resilient electrically conducting metal loop fixed to the enclosed end of the inner tube, said loop being, when relaxed, of a width greater than the inside diameter of the outer tube, whereby to contact the outer tube under residient pressure and a thick washer of resilient material carried by said loop at the end of the tube, said washer being of substantially the same diameter as the inner diameter of the outer tube.

2. In electric current conducting telescopic tube construction, an inner and an outer tube of conducting material, a spring wire loop of current conducting material fixed to the end of the inner tube and adapted to press resiliently against the inner wall of the outer tube, and means for fixing said loop to the said tube end and consisting of a longitudinally bored plug fitting in the tube end and having the ends of said loop passing therethrough, the said loop ends, plug, and tube end being brazed together.

FRANK J. ROSS.

REFERENCES CITED

The following references are of record in the file of this patent:

UNITED STATES PATENTS

| Number | Name | Date |
|---|---|---|
| 596,080 | Morse | Dec. 28, 1897 |
| 641,895 | Scovill | Jan. 23, 1900 |
| 1,097,340 | Lavarack | May 19, 1914 |
| 1,309,060 | Boye | July 8, 1919 |
| 1,357,714 | Lane | Nov. 2, 1920 |
| 1,693,848 | Kyle | Dec. 4, 1928 |
| 1,750,273 | Krauth | Mar. 11, 1930 |
| 2,293,800 | Brown | Aug. 25, 1942 |